United States Patent
Chen (10) Patent No.: US 11,910,059 B2
(45) Date of Patent: Feb. 20, 2024

(54) METHOD FOR RETRIEVING PROGRAM DATA AND CIRCUIT SYSTEM

(71) Applicant: REALTEK SEMICONDUCTOR CORP., Hsinchu (TW)

(72) Inventor: Jun-Hong Chen, Hsinchu (TW)

(73) Assignee: REALTEK SEMICONDUCTOR CORP., Hsinchu (TW)

(*) Notice: Subject to any disclaimer, the term of this patent is extended or adjusted under 35 U.S.C. 154(b) by 99 days.

(21) Appl. No.: 17/375,311

(22) Filed: Jul. 14, 2021

(65) Prior Publication Data
US 2022/0021937 A1    Jan. 20, 2022

(30) Foreign Application Priority Data
Jul. 16, 2020 (TW) ................. 109124107

(51) Int. Cl.
| H04N 21/462 | (2011.01) |
| H04N 21/434 | (2011.01) |
| H04N 21/41 | (2011.01) |
| H04N 21/454 | (2011.01) |
| H04L 61/5014 | (2022.01) |

(52) U.S. Cl.
CPC ....... H04N 21/462 (2013.01); H04L 61/5014 (2022.05); H04N 21/4108 (2013.01); H04N 21/4345 (2013.01); H04N 21/454 (2013.01)

(58) Field of Classification Search
CPC ............. H04N 21/462; H04N 21/4108; H04N 21/454; H04N 21/4345
See application file for complete search history.

(56) References Cited

U.S. PATENT DOCUMENTS

| 7,058,965 B1* | 6/2006 | Gordon ............. H04N 21/2362 370/542 |
| 2005/0094808 A1* | 5/2005 | Pedlow ............ H04N 21/23476 348/E7.056 |
| 2006/0090181 A1* | 4/2006 | Oh ..................... H04N 21/4345 348/E5.005 |
| 2007/0032978 A1* | 2/2007 | Tomizawa ......... H04N 21/4318 348/E5.108 |
| 2007/0033631 A1 | 2/2007 | Gordon et al. |
| 2007/0157263 A1* | 7/2007 | Horii ................ H04N 21/42684 725/86 |
| 2008/0204445 A1* | 8/2008 | Jin ........................ H04N 19/61 375/E7.137 |
| 2010/0218216 A1* | 8/2010 | Kim ................... H04N 21/4348 725/54 |

(Continued)

*Primary Examiner* — Pinkal R Chokshi
(74) *Attorney, Agent, or Firm* — Li & Cai Intellectual Property (USA) Office (57) ABSTRACT

A method for retrieving a program data and a circuit system thereof are provided. The method that uses a dynamic packet identifier (PID) filter to retrieve the program data can be applied to a digital TV system. In the method, a master guide table is retrieved from a transport stream of digital TV signals, and a parsing method is executed to obtain a series of the PIDs. A polling method is used to obtain the program data corresponding to each of the PIDs. A filter window is applied to scan the PIDs for polling the program data corresponding to each of a group of the PIDs at once. After that, the filter window is shifted to a next group of the PIDs for polling the program data with respect to each of the PIDs, and an electronic program guide is accordingly formed.

10 Claims, 4 Drawing Sheets

(56) References Cited

U.S. PATENT DOCUMENTS

| | | |
|---|---|---|
| 2011/0314500 A1 | 12/2011 | Gordon et al. |
| 2013/0055333 A1* | 2/2013 | Kummer .................. H04N 5/76 |
| | | 725/134 |
| 2014/0157342 A1* | 6/2014 | Yahata ............. H04N 21/44016 |
| | | 725/116 |
| 2015/0181279 A1* | 6/2015 | Martch ............. H04N 21/4349 |
| | | 725/131 |
| 2015/0341679 A1 | 11/2015 | Corl |

\* cited by examiner

METHOD FOR RETRIEVING PROGRAM DATA AND CIRCUIT SYSTEM

CROSS-REFERENCE TO RELATED PATENT APPLICATION

This application claims the benefit of priority to Taiwan Patent Application No. 109124107, filed on Jul. 16, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure is related to a method for retrieving a program data, and more particularly to a mechanism of a dynamic packet identifier used for a method for retrieving an electronic program data and a circuit system thereof.

BACKGROUND OF THE DISCLOSURE

With rapid development of digital technologies, the TV has also entered an era of digitalization. The digital television downloads the videos that are characterized in multiple channels and high-quality playback. In addition to the video and audio in the digital content, the digital streaming data includes an electronic program guide (EPG). The EPG allows a user to retrieve the program information of each of the channels in a plurality of time slots, and also to book or record the preferred programs.

A way to obtain the abovementioned electronic program guide is based on specifications of an event information table (EIT) or an extended text table (ETT) in a digital television standard developed by an Advanced Television Systems Committee (ATSC). The event information table defines information of every event in the electronic program guide in a time sequence. The event information can be distinct via packet identifiers (PID). The event information including service information (SI) in a period of time constitutes the electronic program guide. The information included in the event information table includes ID of event, start time, program duration, playback status, introduction of event, and rating of program. The service information is used to describe a transmission system, transmitted content and streaming time.

According to the specifications, the event information table (EIT) or the extended text table (ETT) needs a packet identifier (e.g., PID filter) to retrieve data. However, one packet identifier can only contain three hours of data. If the system wants to retrieve 24 hours of the electronic program guide, eight packet identifiers are required. In general, the electronic program guide requires several of days of content, and in order to satisfy the requirements of the electronic program guide for multiple days (e.g., 7 days), a lot of packet identifiers are needed. Therefore, the cost of hardware is quite high and many different approaches are provided by various manufacturers.

For example, a lot of packet identifiers are defined in the beginning, and a filter can be used to obtain the required data; this requires a higher hardware cost, such as those for a memory. Alternatively, the packet identifiers are set after selecting one of the events in the electronic program guide. After that, the data can be obtained according to the packet identifiers. However, the latter approach depends on a frequency of retrieving the event information table in a data stream and the time to perform a parsing method. The conventional method may still cause a slight delay and therefore result in poor user experience.

SUMMARY OF THE DISCLOSURE

For providing a complete and instant electronic program guide even if the limitation of hardware results in some problems, provided in the disclosure is a method for retrieving a program data and a circuit system thereof. The main embodiment of the disclosure is to dynamically set up a packet identifier (PID) filter that is provided for an event information table (EIT) or an extended text table (ETT) to obtain the electronic program guide (EPG) for reducing loading of the hardware.

In one embodiment, the method for retrieving a program data can be applied to a circuit system. The electronic program guide obtained by the method is then stored to a memory of the circuit system.

In the method, a master guide table (MGT) is firstly obtained from a transport stream of the digital TV signals. A parsing method is then performed upon the master guide table for retrieving packet identifiers. A polling method is performed for retrieving the program data corresponding to the packet identifiers. In the process of polling, a filter window allows the system to scan a set of the packet identifiers so as to retrieve the program data corresponding to the packet identifiers within the filter window. Afterwards, the filter window can be moved to next set of the packet identifiers to go on the polling method for retrieving the corresponding program data. An electronic program guide is formed after the packet identifiers are completely scanned.

Further, a state machine can be used to record the states of the filter window when the filter window is used to retrieve the program data in the polling method.

Still further, in one embodiment, the master guide table will be updated if the master guide table is found to be changed or duration reaches a predetermined time during the process of the parsing method. After that, the system goes on the parsing method to scan the packet identifiers for retrieving the program data. It should be noted that both the parsing method and polling method are preferably performed as background processes in the circuit system.

A memory of the circuit system embodies a program database that is used to store the electronic program guide.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
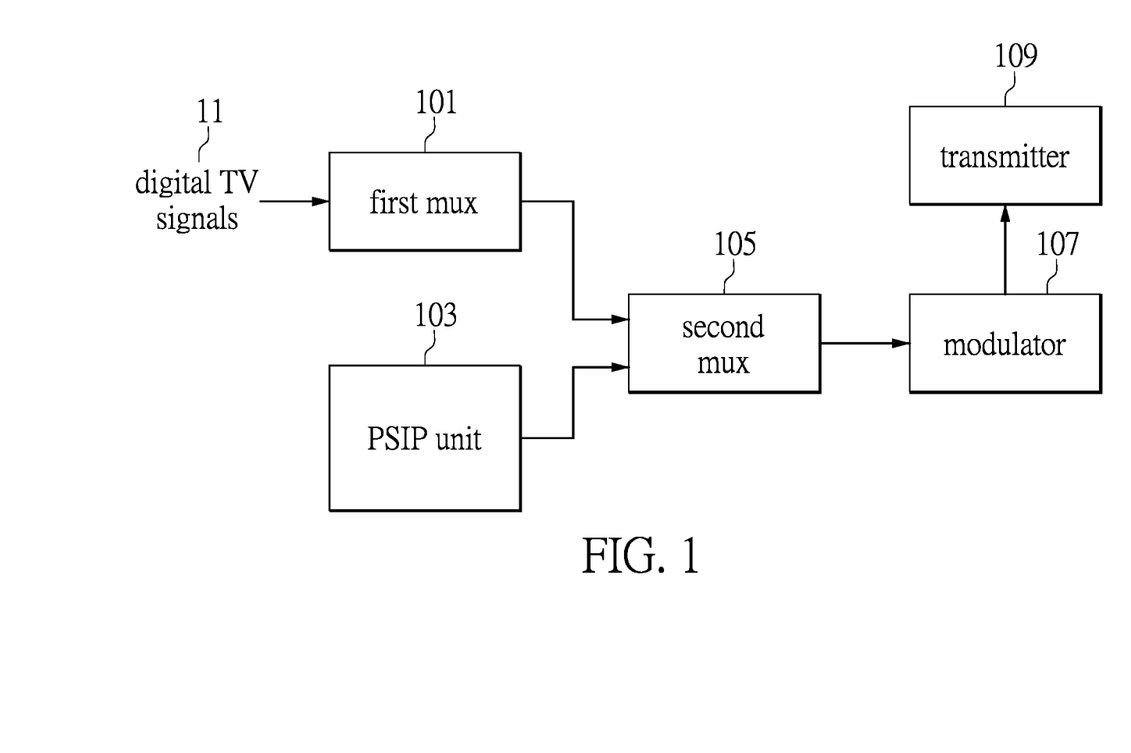
FIG. 1 is a schematic diagram depicting an example of a system framework of a digital TV system that provides program information.

The disclosure is related to a method for retrieving program data and a circuit system implementing the method. The method is applicable to a digital TV system. Reference is made to FIG. 1, which is a schematic diagram depicting a framework of a server that is provided for the digital TV system to provide the program data in one embodiment of the disclosure. A system-end program and system information protocol (PSIP) unit 103 can be implemented by a serving system. The PSIP unit 103 is used for providing the program data under a specific standard. For example, the program data is such as an electronic program guide (EPG) that integrates the program content from a specific source such as a program provider that broadcasts digital TV signals 11. The digital TV signals 11 are multiplexed by a first mux 101 that can be implemented by software or hardware so as to transmit multiple signals via one channel.

Afterwards, another mux, i.e., a second mux 105, is used to combine the digital TV signals 11 and the program data generated by the PSIP unit 103. The program data is then converted to wireless signals via a modulator 107 for forming a streaming data that is configured to be transmitted to a terminal device via a transmitter 109.

In one embodiment of the disclosure, the PSIP unit 103 adopts a program and system information protocol to transmit data. The program and system information protocol defines channels and content ratings that can be applicable to the digital TV system. Under the program and system information protocol, program data can be carried in metadata in streaming data of digital TV signals 11, which can also be a mode for delivering an electronic program guide.

In an embodiment of the digital TV system, the digital TV signals 11 and the program data are digitized by the second mux 105 to form data packets. The data packets should be in compliance with a specific format under a transmission protocol. The transmission protocol is such as a MPEG-2 transport stream (TS) standard. When the digital data is transmitted by the transport stream standard, the digital data is divided into multiple fixed-length TS packets. Each of the TS packets links to a related data stream via a packet identifier (PID). Each of the packet identifiers corresponds to the transport stream of the digital TV signals. The method of the disclosure retrieves the program data by parsing the packet identifiers.

Figure 2:
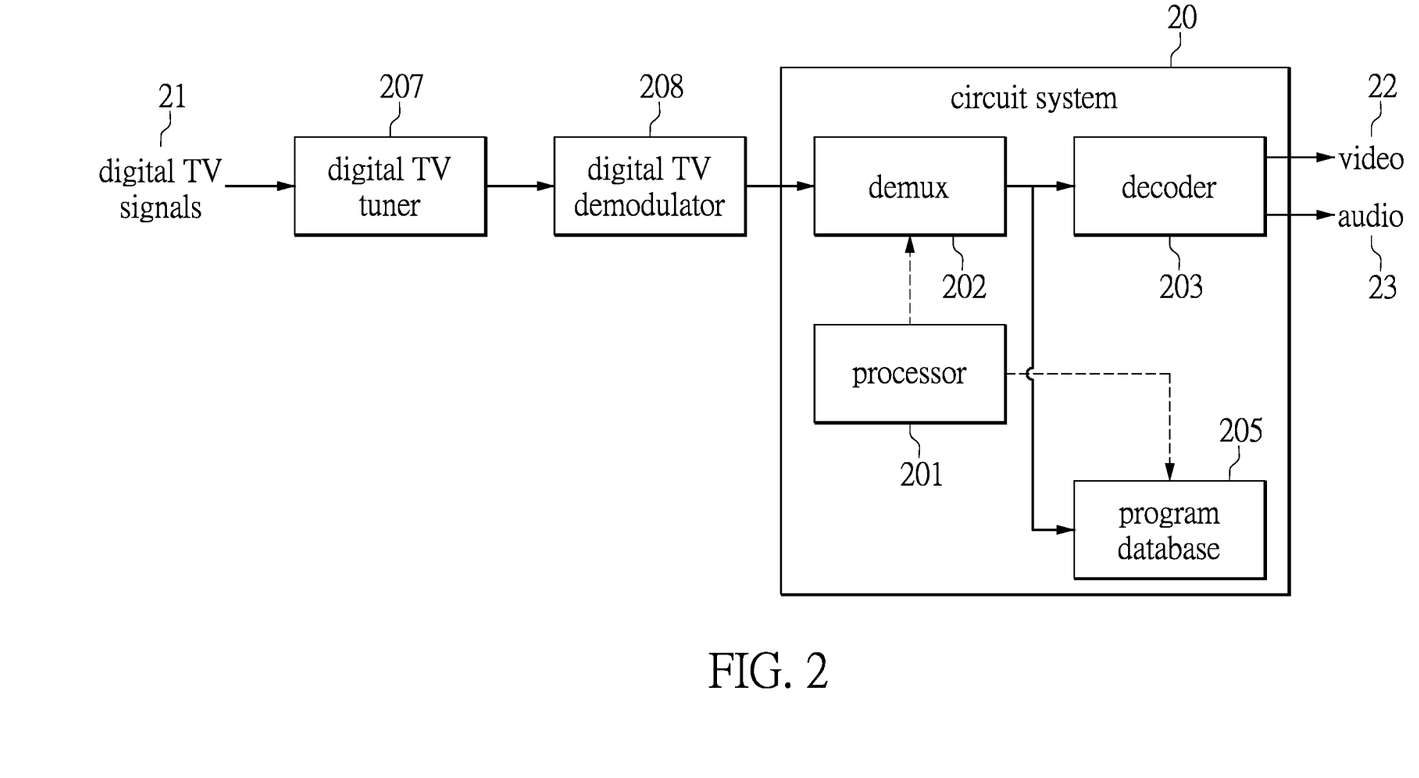
FIG. 2 is a schematic diagram depicting a circuit system that operates a method for retrieving program data according to one embodiment of the disclosure.

Referring to the transport stream generated by the server which is used to provide the digital TV signals and the program data, a circuit system used to receive the transport stream is referred to as shown in FIG. 2.

The circuit system shown in FIG. 2 can be an integrated circuit (IC) or a circuit module in a digital TV. The digital TV allows a user to download a streaming video from the server according to a channel and a time selected by the user, and allows the user to play the streaming video on the TV.

In the figure, digital TV signals 21 received from the server are received by a terminal device, e.g., a digital TV. Taking the receiving wireless signals as an example, when the signals are received by a digital TV tuner 207, the wireless signals can then be filtered, amplified, and converted to analog signals. After that, the signals are provided to a digital TV demodulator 208 for demodulation so as to form the TV signals provided to a circuit system 20.

The circuit system 20 is such as a circuit in a digital TV that includes a processor 201 and other circuit components electrically connected to the processor 201. The processor 201 processes the signals generated by the circuit components and controls their operations. Under the control of the processor 201, the TV signals carrying the program data are divided by a demux 202, a portion of the digital TV signals produce a video 22 and an audio 23 for the user to watch and listen via a decoder 203, and the video 22 is displayed on a screen. A portion of program data having the electronic program guide is processed by the processor 201 and stored to a memory of the circuit system 20. In the embodiment, the memory embodies a program database 205 that is configured to store the electronic program guide and the related data.

It should be noted that the memory of the circuit system 20 forming the program database 205 can be a memory designed for various purposes. In addition to storing the software and operating programs of the system, the memory also stores the software program used to operate the method for retrieving program data and the files or indexes of the electronic program guide obtained by the method. The processor 201 performs the method for retrieving program data through the software program.

The streaming data received by the circuit system 20 is processed to form the TV signals including the video 22 and the audio 23 to be played by the digital TV. When the processor 201 performs the method for retrieving program data, the memory stores the adequate data such as the packet identifiers in the streaming video.

During the time that the circuit system 20 forms the digital TV signals, the user manipulates an operating interface to control the digital TV. The operating interface is such as a remote control or a control panel used to generate a signal to search TV content. The signal is converted to a control signal for the processor 201 to request for the TV content and download related packet identifiers. The packet identifiers allow the system to retrieve an electronic program guide for a period of time.

The conventional method for obtaining the electronic program is based on the format of an event information table (EIT) and an extended text table (ETT) developed by ATSC. The event information table provides information of every event in the electronic program guide in chronological order. The event information can be distinct from the packet identifier, and the electronic program guide is formed from a period of time before and after the event information.

In an exemplary example, the digital TV signals 21 received by the circuit system 20 are processed to be separated and decoded, and played by the digital TV. In the meantime, an electronic program guide formed by the packet identifiers is provided as a reference for the user and can be displayed on the TV screen or a specific interface. The user can learn about a schedule and content of TV programs through the electronic program guide, and can select interesting programs from the electronic program guide or set up a pre-recording program.

In the method performed by the circuit system, the content is digitized as the digital data in compliance with a specific format under a transmission protocol. The transmission protocol is such as the MPEG-2 transport stream (TS) standard supported by the system. The digital data is divided into multiple fixed-length TS packets. Each of the TS packets links to a data stream via the packet identifier. Each of the packet identifiers corresponds to the streaming video in the digital TV signals.

Further, the packet identifier is configured to identify the packets with service information (SI) and electronic program guide. Besides the requisite service information, the MPEG-2 transport stream further includes program specific information (PSI) that includes several tables such as a program association table (PAT), a program map table (PMT), a network information table (NIT) and a condition access table (CAT). The tables include the requisite information that is necessary for decoding and reproducing the TV program and also constitutes the electronic program guide. It is understood that the transport stream of the digital TV signals carries content of the electronic program guide. One of the objectives of the electronic program guide is to find the program and provide the information for decompressing the corresponding stream. The circuit system of the digital TV needs these tables to acquire the program data.

The electronic program guide provides an easy and fast way for the user to obtain the TV channels and program information. In addition to enabling the user to browse the programs, the electronic program guide also classifies the programs, which helps the user to browse and choose one of various types of TV programs. A TV system including a TV set and a built-in or an external set top box allows the user to preset the TV program he wants to watch or record via the electronic program guide.

In an exemplary example, a basic packet identifier in the PSIP adopted by ATSC is "0x1FFB." Thus, when decoding the transport stream, the method should search the PID with "0x1FFB." Next, the above-mentioned tables can be found according to table IDs via a parsing process. For example, the table ID of a master guide table (MGT) is "0xC7." The master guide table is configured to record the channel information such as the information of video and audio in every TV channel, the event information table (EIT) and the extended text table (ETT). When repeatedly parsing the master guide table and the other table IDs of the tables, the various channel information can be obtained.

For retrieving the program data, the circuit system finds a corresponding program data of program one in the program map table according to a user's selection. If the packet identifier of the program one is 22 (PID=22), the polling method performed in the circuit system is to find all the packets with PID=22 in the transport stream for downloading the corresponding digital TV stream. When searching program two, the packet identifiers with PID=40 should be found in the program map table. All the packets with the PID=40 in the transport stream form the streaming video that is configured to be downloaded to the decoder.

According to one of the embodiments of the method for retrieving program data and the circuit system, a dynamic packet identifier filtering mechanism under consideration of hardware specifications is incorporated for preventing the circuit system from being under too much loading due to frequent polling. The dynamic packet identifier filtering mechanism can effectively reduce the use of packet identifiers, and still can obtain the electronic program guide for a certain period of time. Since both the parsing method and the polling method are operated as background processes in the circuit system, the processor and the related circuits of the circuit system can perform the parsing method and the polling method according to a time table or in an idle time of the system. Therefore, the circuit system can obtain the information of the electronic program guide faster and also quickly respond to the user's choice.

The dynamic PID filtering mechanism can be implemented by a software, firmware or hardware-based dynamic PID controller. The dynamic packet identifier controller can be in the processor of the circuit system, as referring to FIG. 3. The current example shows the processor 201 of FIG. 2, and a firmware or circuit implemented dynamic PID controller 300 included in the processor 201.

Figure 3:
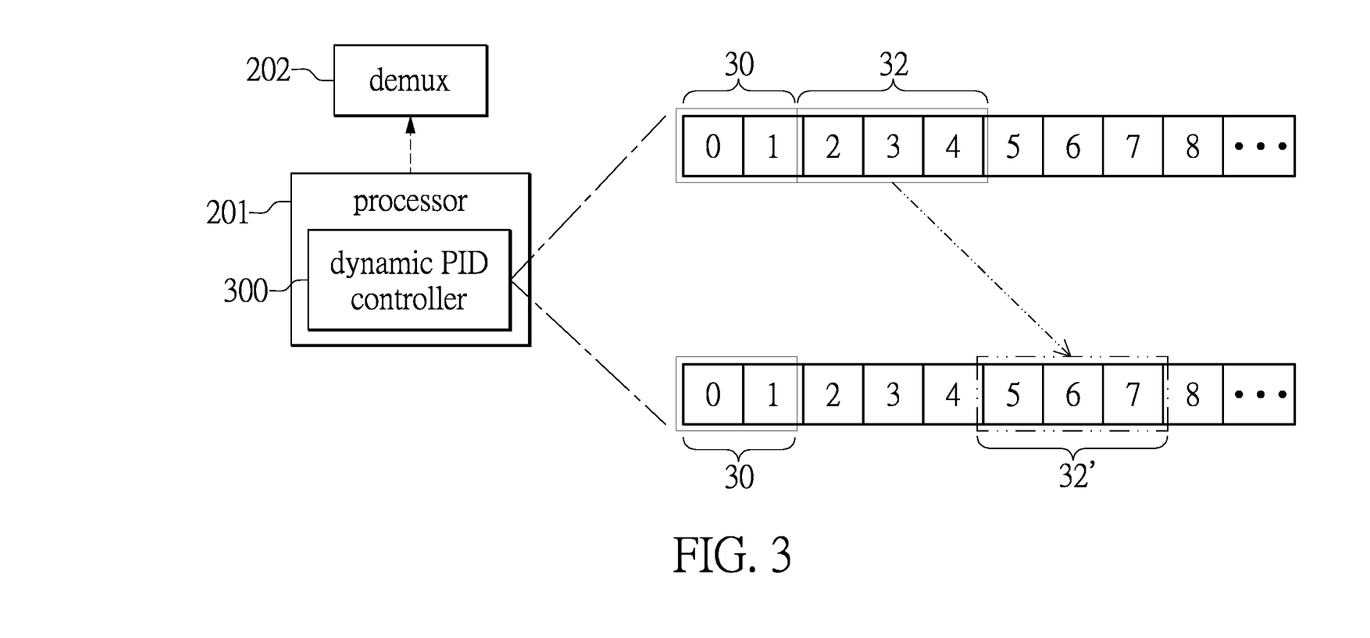
FIG. 3 is another schematic diagram of a dynamic PID controller used in the method for retrieving program data in one embodiment of the disclosure.

According to the embodiment shown in the figure, the transport stream of the digital TV signals carries a series of packet identifiers with PID=0, 1, 2, 3, . . . , and a filter scanning the whole series of packet identifiers is schematically shown in the figure. The dynamic PID controller 213 generally uses a state machine to record the current scanning result. The state machine also records the status of the filter window that is provided for the circuit system to scan the packet identifiers. After polling the packet identifiers that are covered by the current filter window, the filter window is dynamically moved to another group of packet identifiers for scanning the packet identifiers based on different conditions and polling for retrieving the corresponding program data. The mentioned state machine records an entry action in the beginning as the filter starts to operate, an exit action when completing the current polling process, an input action for preparing next filter process, and a transition action that the filter window is dynamically moved to a next group of packet identifiers. The quantity of packet identifiers that the filter window can scan is determined according to a setting value. The setting value can be set up by the user according to his need or decided by the system according to capability of hardware.

In the present example, a fixed PID filter filters out the packet identifiers with PID=0 and 1 from the whole series of packet identifiers. The packet identifier with PID=0 indicates the current packet identifier, and the packet identifier with P=1 indicates the next packet identifier. These two fixed PID filters 30 are used to identify the above specific information. In addition to the fixed PID filters, the subsequent packet identifiers can be scanned by a dynamic PID filter. The dynamic PID filter forms a filter window that covers a first PID group 32 for conducting a first scanning process. The polling method is applied to the first PID group 32 for retrieving the program data corresponding to each of the packet identifiers. The present example shows several packet identifiers (e.g., three packet identifiers) with PID=2, 3, 4. After the program data corresponding to the packet identifiers is retrieved through the filter window by the polling method, the filter window is moved to a second PID group 32' for performing the polling method to retrieve the next program data corresponding to the packet identifiers, for example the packet identifiers with PID=5, 6, 7. Through the dynamic PID filtering mechanism, the circuit system can be prevented from being under increased loading due to frequent polling. The whole packet identifiers can be processed by the polling method by the dynamic PID filter. The electronic program guide is therefore formed and stored to the memory of the circuit system. The electronic program guide is provided for the user to browse the program data conveniently.

Figure 4:
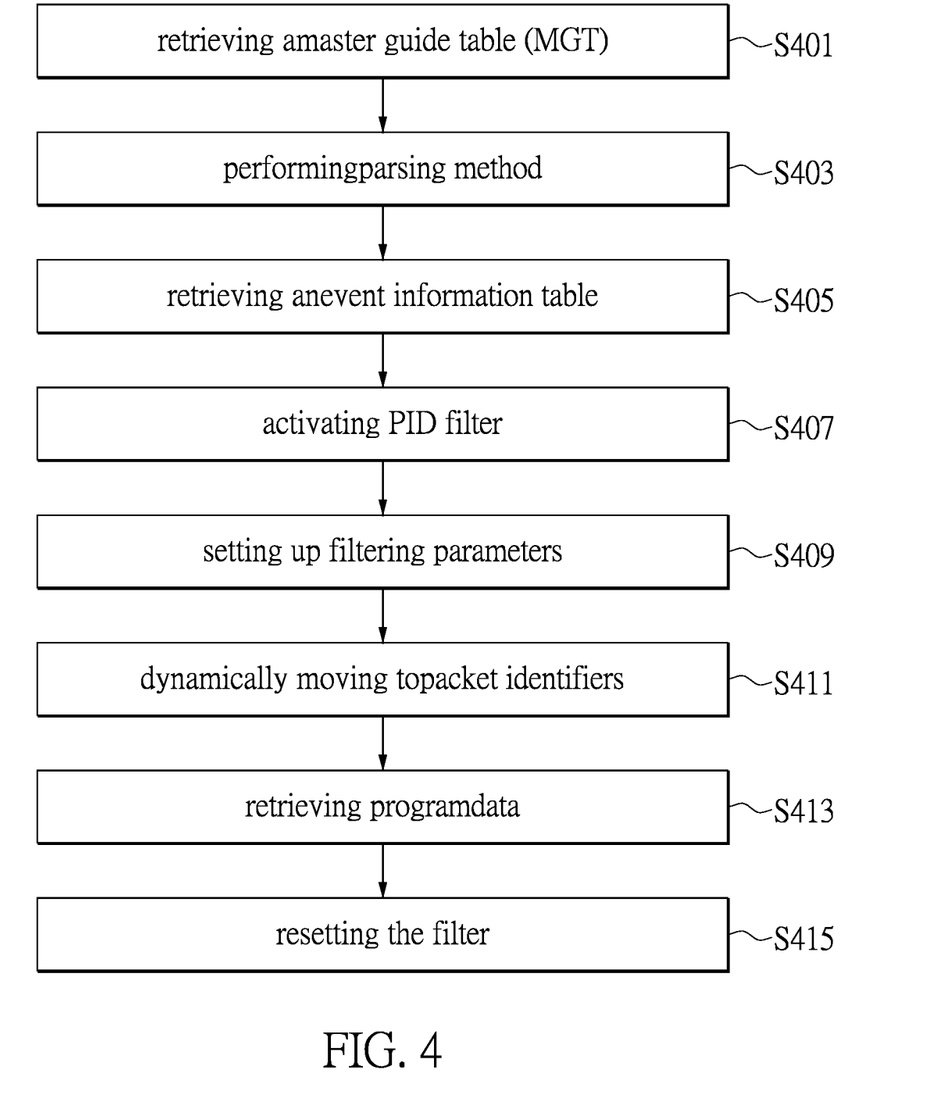
FIG. 4 depicts a flow chart of the method for retrieving program data in one embodiment of the disclosure.

FIG. 4 shows a flow chart describing the method for retrieving program data according to one embodiment of the disclosure. The method is operated in a circuit system. In the beginning, a master guide table (MGT) is obtained from the transport stream in the digital TV signals (step S401). The master guide table can be retrieved from an electronic program guide server, as shown in FIG. 1. The master guide table is a main source of the electronic program guide and also one of the main sources of the program data retrieved by the circuit system. For retrieving the program data in the transport stream, a main process continuously performs the parsing method so as to obtain a series of packet identifiers (step S403) to form a list of packet identifiers. As shown in FIG. 3, the parsing method is used to form an event information table or an extended text table with respect to every event in the electronic program guide in chronological order (step S405). The event information table and the extended text table are distinct from the packet identifiers. The polling method is used to retrieve the program data such as the electronic program guide according to the packet identifiers.

Afterwards, in the process of polling the program data, a PID (packet identifier) filter in the circuit system is activated (S407). Filtering parameters are also set as the filter window based on the capability of hardware (step S409). The filter window can be dynamically moved to conduct dynamic filtering (step S411). A state machine can be used to record the states of the filter window when it is in operation. The program data can be retrieved by scanning the packet identifiers one at a time according to the list of the packet identifiers (step S413). The filtering parameters can be reset after completing the process (step S415).

It should be noted that, when performing the parsing method, the master guide table will be firstly updated if the version of master guide table is found to be changed. Afterwards, the process of parsing method goes on for scanning the packet identifier for retrieving the program data. Further, the data can be updated in advance if the master guide table changes (i.e., the version of the table changes). Still further, the master guide table can be updated if the duration meets a predetermined time since new content will be produced regularly.

In summation, the method for retrieving program data of the disclosure uses a dynamic PID filtering mechanism to reduce use of the packet identifiers required by the related hardware, and in the meantime to retrieve information of the electronic program guide. Thus, the method is able to obtain sufficient content of the program data, e.g., seven days of content, even when saving hardware costs. In terms of the user experience, since both the parsing method and the polling method are operated as background processes, the program data can be obtained quickly. Therefore, the program data can be instantly shown when the user selects one of the program data when entering the electronic program guide. The method allows the user to seamlessly watch the program that is selected.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for retrieving a program data, which is adapted to a circuit system, comprising:
   retrieving a master guide table from a transport stream of digital TV signals;
   performing a parsing method as a background process upon the master guide table so as to obtain a series of packet identifiers; and
   performing a polling method as another background process by a dynamic packet identifier controller according to the packet identifiers so as to retrieve the program data corresponding to each of the packet identifiers;
   wherein, in the polling method, the dynamic packet identifier controller retrieves the program data corresponding to each of the packet identifiers within a filter window when using the filter window to scan a set of the packet identifiers at once, and a quantity of the packet identifiers being scanned by the filter window is decided according to a setting value that is set up based on a need or determined by the circuit system; and
   wherein the dynamic packet identifier controller uses a state machine to record states of the filter window; afterwards another program data corresponding to a next set of packet identifiers is retrieved when the dynamic packet identifier controller moves the filter window to the next set of packet identifiers, and an electronic program guide is formed after the packet identifiers are completely scanned.

2. The method according to claim 1, wherein, in a process of performing the parsing method, if the master guide table has been changed, or a predetermined time has been reached, the master guide table will be updated for continuing the parsing method and scanning the packet identifiers for retrieving the program data.

3. The method according to claim 1, wherein the parsing method is used to form an event information table or an extended text table with respect to every event in the electronic program guide in a chronological order.

4. The method according to claim 3, wherein, in a process of performing the parsing method, if the master guide table has been changed, or a predetermined time has been reached, the master guide table will be updated for continuing the parsing method and scanning the packet identifiers for retrieving the program data.

5. The method according to claim 4, wherein the master guide table is retrieved from an electronic program guide server.

6. A circuit system disposed in a digital TV system, comprising:
 a processor that implements a dynamic packet identifier controller, and a memory;
 wherein the processor performs a method for retrieving program data comprising:
  retrieving a master guide table from a transport stream of digital TV signals;
  performing a parsing method as a background process upon the master guide table so as to obtain a series of packet identifiers; and
  performing a polling method as another background process, by the dynamic packet identifier controller, according to the packet identifiers so as to retrieve the program data corresponding to each of the packet identifiers;
 wherein, in the polling method, the program data corresponding to each of the packet identifiers within a filter window is retrieved when using the filter window to scan a set of the packet identifiers at once, and a quantity of the packet identifiers being scanned by the filter window is decided according to a setting value that is set up based on a need or determined by the circuit system; and
 wherein the dynamic packet identifier controller uses a state machine to record states of the filter window; afterwards another program data corresponding to a next set of packet identifiers is retrieved when the dynamic packet identifier controller moves the filter window to the next set of packet identifiers, and an electronic program guide is formed after the packet identifiers are completely scanned.

7. The circuit system according to claim 6, wherein, in a process of performing the parsing method, if the master guide table has been changed, or a predetermined time has been reached, the master guide table will be updated for continuing the parsing method and scanning the packet identifiers for retrieving the program data.

8. The circuit system according to claim 6, wherein the memory implements a program database and the electronic program guide is stored to the program database.

9. The circuit system according to claim 8, wherein, in a process of performing the parsing method, if the master guide table has been changed, or a predetermined time has been reached, the master guide table will be updated for continuing the parsing method and scanning the packet identifiers for retrieving the program data.

10. The circuit system according to claim 9, wherein the master guide table is retrieved from an electronic program guide server.

* * * * *